(12) United States Patent
Bejerano et al.

(10) Patent No.: US 7,583,602 B2
(45) Date of Patent: Sep. 1, 2009

(54) METHODS AND DEVICES FOR ROUTING TRAFFIC USING A CONFIGURABLE ACCESS WIRELESS NETWORK

(75) Inventors: Yigal Bejerano, Springfield, NJ (US); Amit Kumar, New Delhi (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 803 days.

(21) Appl. No.: 10/879,064

(22) Filed: Jun. 30, 2004

(65) Prior Publication Data

US 2006/0002303 A1 Jan. 5, 2006

(51) Int. Cl.
*H04L 12/26* (2006.01)

(52) U.S. Cl. .............................. 370/238; 370/913

(58) Field of Classification Search .............. 370/235, 370/237, 238, 252, 254–258, 392
See application file for complete search history.

(56) References Cited

U.S. PATENT DOCUMENTS

2006/0206857 A1* 9/2006 Liu et al. .................. 717/104

OTHER PUBLICATIONS

Akyildix et al, "A survey on sensor networks", IEEE Communications Magazine, 40 (08): 102-114, Aug. 2002.
Asada et al, "Wireless integrated network sensors: Low power systems on a chip", Proceedings, European Solid State Circuits Conference, 1998.
Zussman et al, "Energy Efficient routing in ad hoc disaster recovery networks", Proceedings, IEEE INFOCOM '03, 2003.
Nokia, Nokia RoofTop Solution, Nokia and Vista Broadband Networks Earn Technical Industry Award for Innovative Fixed Wireless Broadband Products and Solutions, Jan. 2002, http://press.nokia.com/PR/200201/845406..5.html.
Jones et al, "A survey of energy efficient network protocols for wireless networks", Wireless Networks 7 (4): 343-358, 2001.
Petrioli et al, Special issue on energy conserving protocols, Mobile Networks and Applications 6 (3), Jun. 2001.
Zheng et al, "On-demand power management for ad hoc networks", Proceedings, IEEE INFOCOM '03, 2003.
Schurgers et al, "Pamas: Power aware multi-access protocol with signalling for ad hoc networks", ACM Computer Communications Review: 5-26, Jul. 1999.
Tseng et al, "Power-saving protocols for IEEE 802.11-based multi-hop ad hoc networks", Proceedings, IEEE INFOCOM '02, 2002: 200-209.
Ye et al, "An energy-efficient mac protocol for wireless sensor networks", Proceedings, IEEE INFOCOM '02, 2002: 1567-1576.
Jung et al, "An energy efficient mac protocol for wireless LANs", Proceedings, IEEE INFOCOM '02, 2002: 1756-1765.
Schurgers et al, "Optimizing sensor networks in the energy-latency-density design space", IEEE Transactions on Mobile Computing 1 (1): 70-80, Jan.-Mar. 2002.
McDysan et al, ATM Theory and Applications, McGraw-Hill, 1998.

(Continued)

*Primary Examiner*—Kevin C Harper
*Assistant Examiner*—Wanda Z Russell

(57) ABSTRACT

A configurable access network (CAN) architecture is used to identify primary routing paths that allows each wireless station within a static, multi-hop wireless CAN to route packetized data in a way that simplifies the operation of each station and makes more efficient use of the limited energy available to each station.

30 Claims, 3 Drawing Sheets

OTHER PUBLICATIONS

Davie et al, MPLS: Technology and Applications, Morgan Kaufman Publishers, San Francisco, CA, 2000.

Dinitz et al, "On the single-source unsplittable flow problem", IEEE Symposium on Foundations of Computer Science—FOCS '98: 290-299, 1998.

Bejerano et al, "Efficient integration of multi-hop wireless and wired networks with qos constraints", Proceedings, Eighth Annual International Conference on Mobile Computing and Networking—MOBICOM '02: 215-226, 2002.

Garey et al, Computers and Intractability: A Guide to the Theory of NP-Completeness, Freeman Publications, New York, 1979.

Garg et al, "Faster and simpler algorithms for multicommodity flow and other fractional packing problems", IEEE Symposium on Foundations of Computer Science—FOCS '98: 300-309, 1998.

Kolliopoulos et al, "Improved approximation algorithms for unsplittable flow problems", IEEE Symposium on Foundations of Computer Science—FOCS '97: 426-435, 1997.

Diestel, Graph Theory (Graduate Texts in Mathematics, 173), Springer Verlag, New York, 1997.

* cited by examiner

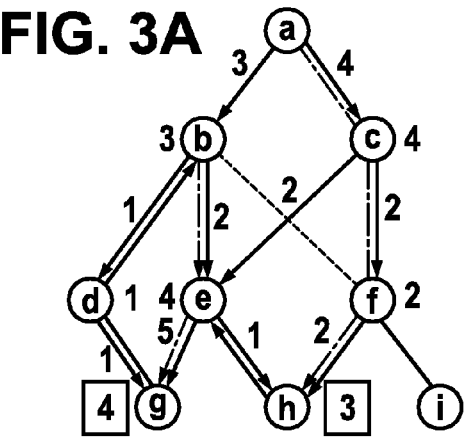
FIG. 3A
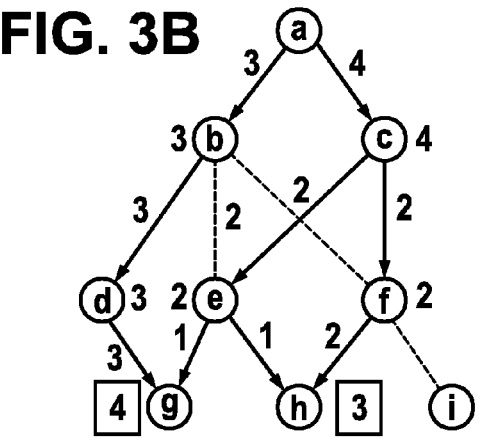
FIG. 3B
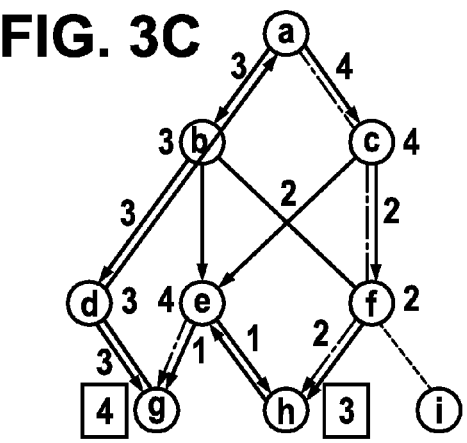
FIG. 3C
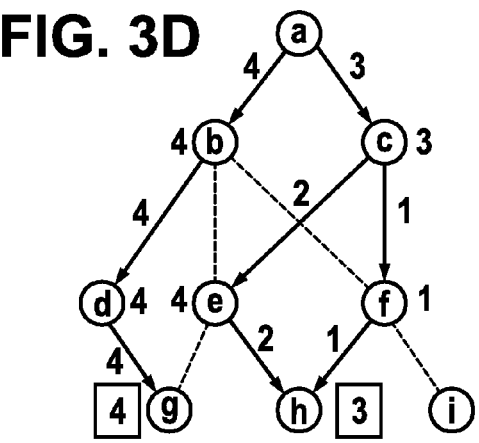
FIG. 3D
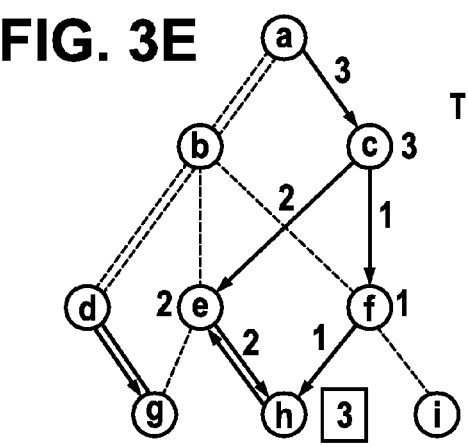
FIG. 3E
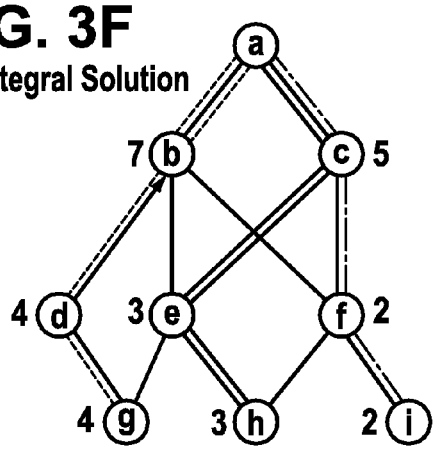
FIG. 3F
The Final Integral Solution
Key:  Terminal    ⟵ Backward Path    ⤏ Forward Path

METHODS AND DEVICES FOR ROUTING TRAFFIC USING A CONFIGURABLE ACCESS WIRELESS NETWORK

BACKGROUND OF THE INVENTION

Wireless stations (e.g., wireless laptop computers) in a static, multi-hop wireless network receive and transmit information referred to as packets of data. Upon receiving a packet, a station must determine how and where to route the packet. That is, each station determines whether the packet needs to be forwarded to a next wireless station and, if so, the station must determine the identity of the next station, etc. There are various routing techniques in existence. However, many of them are complex and require a station to perform multiple tasks and take up significant overhead, all of which use some part of the limited battery power/energy (collectively "energy") available to a station.

Energy considerations are almost always important. However, in static, multi-hop wireless networks, they are very important. In such networks, packets from a source wireless station (i.e., source of a packet or message) may need to be routed through many intermediate stations before reaching their final destination wireless station. If one of the stations along the path the packets must travel fails because it runs out of available energy (i.e., its batteries run down), the packets cannot be relayed through that station. This may prevent the packets (and their associated messages) from reaching their ultimate destination unless a suitable back-up path can be quickly identified and utilized.

It is, therefore, important to make efficient use of the limited energy available to wireless stations in a static, multi-hop wireless network. In general, the more complex the routing technique, the more energy needed to implement such a technique.

When packets are routed between source and destination stations, a packet necessarily travels over numerous, small intermediate routes. To implement such a routing technique within each wireless station, which is the norm for multi-hop wireless networks, requires complex processing. In effect, this means that each wireless station in the network must maintain a complex software or firmware program associated with the routing technique which, when executed, takes up large amounts of computational time and energy.

It is, therefore, desirable to provide for routing techniques for static, multi-path wireless networks that simplify the operation of such stations and that require wireless stations to use less energy in order to maximize the lifetime of each of the wireless stations and, therefore, the overall wireless network.

Co-pending patent application Ser. No. 10/879,062, the disclosure of which is incorporated herein as if set forth in full herein, discloses a novel architecture for static, multi-hop wireless networks. This architecture describes configurable access wireless networks (CANs) which include a controller that is responsible for determining the topology of a given network, as well as the routing paths (and packet transmission schedules) associated with each wireless station. By placing topological modeling and routing/scheduling decision-making into a controller instead of requiring each wireless station to complete such tasks, new routing techniques may be implemented that allow a station's operation to be simplified and which reduce the energy required by each station.

It is, therefore, further desirable to provide routing techniques that make use of a CAN architecture in order to provide simplified wireless stations and to allow wireless stations to use less energy in order maximize the lifetime of static, multi-hop wireless networks.

SUMMARY OF THE INVENTION

We have recognized that CANs may be utilized to provide simplified wireless stations and to maximize the lifetime of static, multi-hop wireless networks by implementing routing techniques that route packets along primary routing paths ("primary paths") that are used most often within the network. Identifying these primary paths is a complex problem which requires the generation of so-called "fractional routing" and "integral routing" solutions, the latter being ultimately used to identify the primary paths.

In more detail, the present invention includes methods for generating a fractional routing solution for each wireless station in a CAN; rounding the fractional solution into an integral solution that identifies a primary path for each of the wireless stations; and controlling the routing of traffic through each of the wireless stations using the identified primary paths.

Using the steps just outlined, the present invention provides for a number of alternative routing techniques depending on whether or not any limits or bounds are placed on the initial energy levels and bandwidth demands of the wireless stations within the network.

After each primary path is identified, it is transferred to its respective wireless station. By using the so-identified paths to route traffic, the operation of each station is simplified (and so may be its design) and the amount of energy required by each station is reduced as compared with conventional stations in a multi-hop wireless network.

BRIEF DESCRIPTION OF THE DRAWINGS

FIGS. 3(a)-3(f) pictorially depict steps of a rounding technique as applied to the fractional solution depicted in FIG. 2 according to embodiments of the present invention.

DETAILED DESCRIPTION OF THE INVENTION

The present invention provides for the identification of primary routing paths used most often within a CAN to simplify the operation of wireless stations in, and to maximize the lifetime of, a static multi-hop wireless network.

Figure 1:
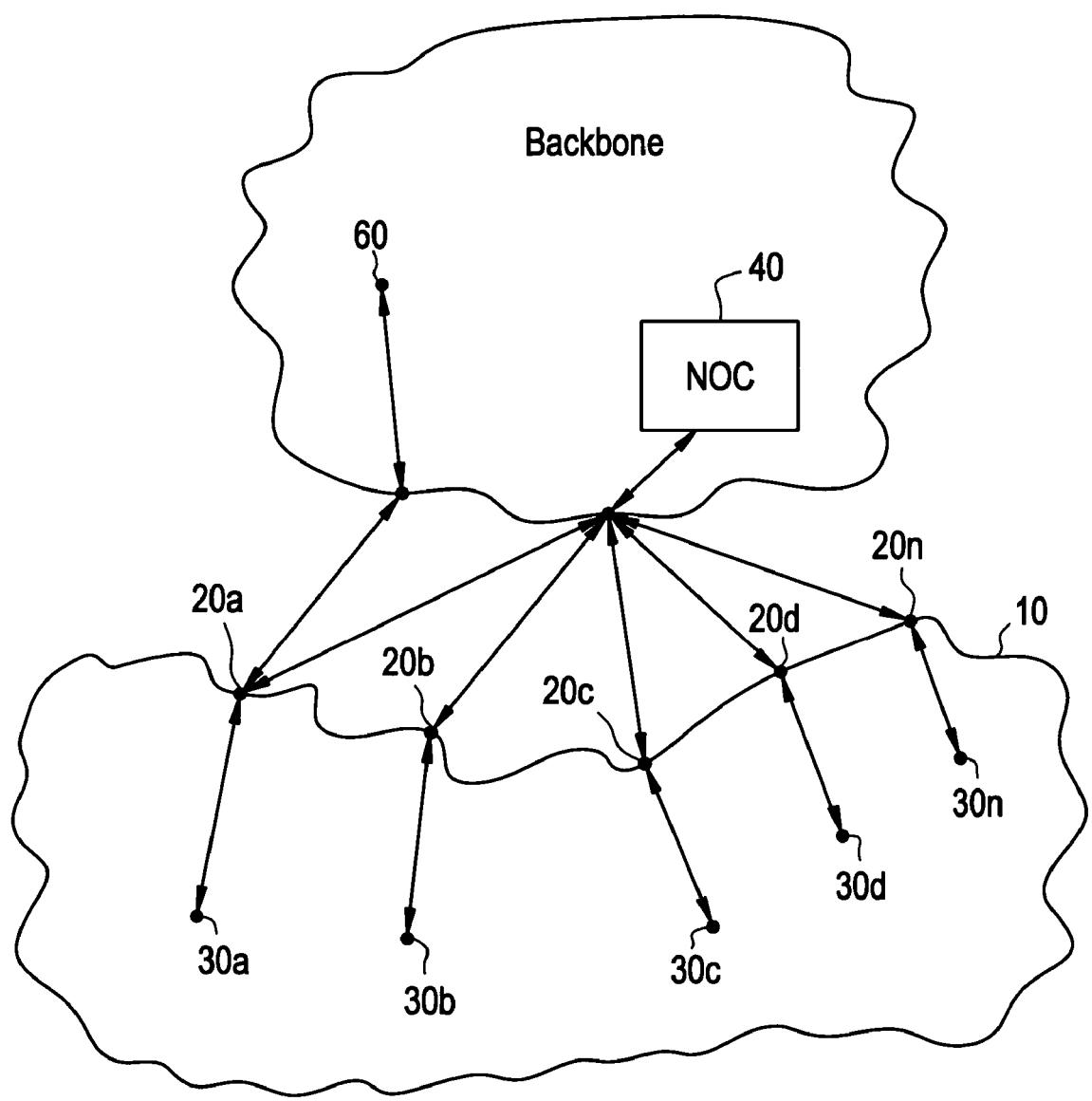
FIG. 1 depicts a simplified illustration of a CAN that can be used to route traffic according to embodiments of the present invention.

Referring now to FIG. 1, there is shown a simplified illustration of a CAN 10. As shown CAN 10 includes one or more access point stations ("APs" for short) 20a,20b, ... 20n and non-AP stations ("stations" for short) 30a,30b, ... 30n (where "n" is the last AP or station). In one embodiment of the present invention, a network operation center or controller ("NOC") 40 external to the CAN 10 is operable to determine the topology of network 10 as well as identify the primary paths associated with stations 20a,20b, ... 20n and 30a,30b, ... 30n. Thereafter, NOC 40 is further operable to configure each wireless station 20a,20b, ... 20n and 30a,30b, ... 30n with its respective, so-identified paths so that each station's operation may be simplified and so that each station requires less energy than previously thought possible.

The simplified operations and energy reductions stem from the fact that the NOC 40 is now responsible for topological modeling and routing decision-making; these operations need no longer be carried out by an individual station 20a, 20b, ... 20n and 30a,30b, ... 30n as is the case in existing static, multi-hop wireless networks. This greatly reduces the number of operations needed to be performed, and overhead required, by each station. Such reductions lead to a savings in valuable energy resources.

Before presenting a more detailed discussion of the present invention, some additional background information may help the reader gain a better understanding of the present invention.

When stations within a network are powered by an "unlimited" source of energy (e.g., one that is constant and reliable; something other than a battery), a routing technique can attempt to fairly balance the traffic load (i.e., a number of packets) among all stations by implementing complex routing techniques. Again, in this scenario, because power is constantly available routing techniques need not be energy-sensitive and may include complex operations that allocate bandwidth fairly to each station so that each station's share of available bandwidth is maximized.

When, however, wireless networks are comprised of stations that are powered by limited sources of energy, e.g., batteries, goals such as load balancing may no longer be possible. Instead, the primary goal shifts towards routing traffic in such a way that energy is conserved in order to maximize the network's lifetime. To conserve energy, the present invention provides techniques that shifts routing decisions from individual stations to a controller. After the decisions have been made, the stations need only update forwarding tables in order to carry out the routing decisions made by the controller. Though the controller may use complex techniques to generate such decisions, the operation of individual stations is greatly simplified.

Approaching routing in this manner, the present inventors discovered that traffic load balancing problems could be viewed as sub-problems of a lifetime maximization problem. This recognition made it possible for the present inventors to formulate routing techniques by solving issues related only to a lifetime maximization problem.

As discussed in more detail in co-pending U.S. patent application Ser. No. 10/879,062 referred to above, prior to identifying primary paths for each wireless station within network 10, NOC 40 must determine a topological model of network 10.

A static, multi-hop wireless network can be modeled by a graph $G(V,E)$ where V is the total number of stations. If A represents a set of APs and U a set of non-AP stations, then $U=V-A$. The notations $b_\upsilon$ and $d_\upsilon$ can be used to denote the initial energy level and bandwidth demand of every station v, where $\upsilon \in U$, respectively. The aggregated flow of all traffic (e.g., packets) traversing through a station $v(v \in V)$, including the traffic generated by station v itself, can be denoted by $F_v$.

Using this terminology, routing techniques provided by the present invention identify a set of feasible primary paths, referred to as Virtual Connections (VCs). A VC of a station v is identified by a unique label at each station in a single path $P_\upsilon$, where $P_v=\{u_0=v,u_1,u_2, \ldots, u_k=a \in A\}$. Packets are forwarded along path $P_v$ by carrying the address and corresponding label for each, next successive wireless station in the header portion of each packet. A VC is considered a feasible path if every wireless station, v, where $v \in U$, is associated with a path $P_\upsilon$ that specifies its packet route and sustains a volume of traffic or flow, $d_\upsilon$. Moreover, the aggregated flow through every station must satisfy the following two capacity constraints:

1. The aggregated flow, $F_a$, through each AP, a, where $a \in A$, is at most W, where W is a link capacity; and 2. The aggregated flow, $F_\upsilon$, through each non-AP station, $\upsilon$, where $v \in U$ is at most $(W+d_\upsilon)/2$.

APs operate as end-points for the flow of packets. Consequently, the flow through an AP is bounded only by the link capacity W. Each non-AP wireless station, $\upsilon$, where $v \in U$, on the other hand operates as a relay for a flow of size $F_v-d_v$, where its flow is bounded by $W \geq 2 \cdot F-d_\upsilon$. These two constraints ensure that all of the routing techniques provided by the present invention do not exceed the capacity W of a wireless link.

In general, the identification of feasible primary paths or VCs (these terms will be used synonymously herein) for wireless stations is a complex, so-called "NP-hard" problem to solve. Nonetheless, the present inventors were able to discover techniques that substantially approximate acceptable solutions to this NP-hard problem.

Having presented some additional background information, we now turn to a discussion of the routing techniques discovered by the present inventors.

The present invention provides for at least three, related routing techniques that may be implemented in CAN 10, using NOC 40 for example, to simplify the operation of stations within, and maximize the lifetime of, CAN 10. In one embodiment of the invention, one routing technique generates primary paths by first making some simplifying assumptions. It is assumed that each wireless station within network 10 has either the same bandwidth demand (i.e., each needs to transmit and/or receive the same number of packets per unit of time) or initial energy level. Based on this assumption, when this technique is implemented, the lifetime of CAN 10 can be assumed to be at least 50% of an optimal lifetime (i.e., the lifetime will not drop below 50% of an optimal lifetime). Though not near optimal, this technique provides a predictable, base lifetime (i.e. a "floor") that can be achieved.

It should be noted that if each of the stations is assumed to have (or does have) substantially the same energy level and bandwidth demand, then the techniques of the present invention can formulate a routing technique which provides an optimal network lifetime.

A second routing technique provided by the present invention comprises a technique that, when implemented, allows a network to achieve a lifetime that is greater than the 50% provided by the first technique. This technique is a variant of the first one. Instead of assuming that each station has the same bandwidth demand or initial energy level, however, this technique assumes that each station has a different (e.g., arbitrary) initial energy level and bandwidth demand but places upper and lower bounds on the bandwidth demands. The overall lifetime realized by wireless stations using this second technique, when compared to an optimal lifetime, is at least, $$\frac{2}{2+\alpha},$$

where $\alpha$ is a ratio of the upper and lower bandwidth demand bounds.

The third routing technique provided by the present invention is by far the most general of the three techniques in that it places no bounds on bandwidth demands or energy levels (i.e., as in the second technique, a station may have an arbitrary, initial energy level). However, the trade-off is that wireless stations implementing this technique have a lifetime that is at least 20% of an optimal lifetime, lower than the first two techniques.

Before presenting a detailed discussion of each of the three techniques, it should be understood, as mentioned before, that each of the techniques involve a number of intermediate steps. Initially, each technique provides a so-called "fractional routing solution" to the NP-hard problem of identifying primary routing paths. A "fractional routing solution" represents a theoretical solution where packets from one original flow of traffic ("flow" for short) are broken up into many, smaller "fractional flows" (i.e., each of the smaller flows is a fraction of the original flow). This solution is not sent to each wireless station. Rather, it represents an intermediate solution which can then be further used to generate the actual primary paths. This fractional solution may be formulated or generated by a controller, like NOC 40, or a separate controller external to network 10 (not shown in FIG. 1).

After the fractional routing solution is generated, the next step is to further simplify this fractional solution into an integral routing solution. This is done by applying rounding techniques to the fractional flows. In effect, the fractional flows (fractions) are rounded to a single, "integer flow" (integer) for traffic associated with each demand of each station. Once this integral solution is generated, it can then be solved to identify the primary paths. Again, the rounding and generation of the integral solution may be carried out by NOC 40 or a separate controller. These paths can be then be transmitted to each wireless station 20a,20b, ... 20n and 30a,30b, ... 30n, for example, in the form of one or more forwarding tables.

The generation of fractional and integral solutions provides the present invention with the ability to guarantee lower bounds (e.g., 20%, 50%) for the lifetime of a network that is made up of wireless stations, each having different characteristics (e.g., different bandwidth or energy/power level requirements). The proof of this is beyond the scope of the present invention and is not needed for an understanding or appreciation of the present invention.

The generation of a fractional solution (as it applies to all three techniques) may be modeled by formulating a model where all of the wireless stations within a network may serve as relays to relay packets along a path. Consider a graph G(V,E) which includes an auxiliary source station s, where s is connected to all the APs and is the source of all flows reaching each station, and where the demand of every wireless station, $\upsilon$, where $v \in U$ is represented by a volume of traffic flow, $d_\upsilon$, from an AP to each wireless station v. For completeness, let $d_a = 0$ for every AP, a, where $a \in A$. The flow along the link (u, v) from station u to station $\upsilon$ can be denoted as $f_{u,v}$, and the aggregated flow through station u as $F_u$. It should also be understood that because s is an auxiliary station, it is not required to satisfy any capacity constraints.

Recalling now that the present invention seeks to determine routes/pathways that maximize the lifetime of a network, in one embodiment of the invention this goal is achieved by maximizing a minimal, initial energy-to-traffic ratio for each wireless station defined by the function, $\min_{v \in U} b_v / F_v$. Because the variables in this function are related to flows associated with wireless stations, this function is non-linear (i.e., practically speaking, too difficult to solve). In a further embodiment of the invention, the present inventors discovered that this difficulty could be overcome by introducing an auxiliary variable $Y_{max}$, which is a variable that is related to a network lifetime, in particular, to the inverse of the lifetime of a network, i.e., $Y_{max} = \max_{v \in U} F_v / b_v$. Making use of this auxiliary variable, the fractional routing problem can be formulated as a linear program (LP) as follows:

$$\min Y_{max}$$

subject to:

$$\forall v \in U: \quad Y_{max} \geq \left(d_v + \sum_{u \in N(v)} f_{u,v}\right) \bigg/ b_v \quad (1)$$

$$\forall v \in V - \{s\}: \quad \sum_{u \in N(v)} f_{u,v} = d_v + \sum_{u \in N(v)} f_{v,u} \quad (2)$$

$$\forall a \in U: \quad W \geq \sum_{u \in N(a)} f_{u,a} \quad (3)$$

$$\forall v \in U: \quad (W + d_v)/2 \geq \sum_{u \in N(a)} f_{v,u} \quad (4)$$

$$\forall (u, v) \in E: \quad f_{u,v} \geq 0, f_{v,u} \geq 0 \quad (5)$$

In this formulation, Equation (1) represents a constraint that ensures that $Y_{max}$ is an upper bound of the inverse of the lifetime of every station, $\upsilon$, where $v \in U$. Similarly, Equation (2) represents a flow conservation requirement constraint that ensures that the flow withdrawn by station v to meet its own bandwidth demand is exactly $d_\upsilon$. The second constraint ensures that an aggregated flow originating at source station s is $\Sigma_{v \in U} d_v$. Finally, Equations (3) and (4) represent constraints that guarantee the capacity constraints, while Equation (5) ensures that all the flows are positive.

In yet additional embodiments of the present invention, an optimal fractional solution based on this new linear program can be derived using an LP solver or maximal flow techniques known to those skilled in the art. Moreover, it was determined that once this new linear program was discovered, other known approximation methods could be used to find near optimal solutions. Upon further consideration, the present inventors discovered that the linear program they discovered could be calculated in a polynomial time period (in a reasonable amount of time) as compared to existing techniques which require an exponential time period (i.e., an unreasonable amount of time).

Figure 2:
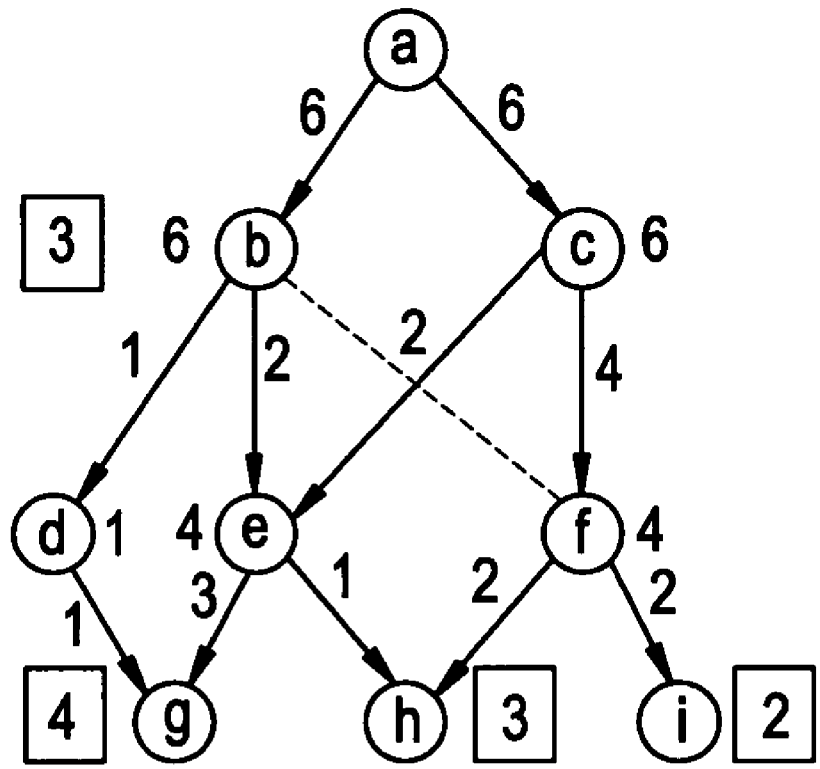
FIG. 2 depicts a fractional routing solution according to one embodiment of the present invention.

FIG. 2 depicts one example of a fractional routing solution. Here, the network contains a single AP, a, that also serves as a source, wireless station (i.e., station s is omitted). In this example, it is assumed that the initial energy level of all of the stations, V, where $v \in V - \{a\}$, is the same, namely $b_\upsilon = 120$, and the aggregated flow through stations b and c is 6. Thus, the maximal network lifetime can be shown to be 120/6=20.

As indicated before, after a fractional routing solution is generated, it must be simplified further before it can be of any practical use in identifying primary paths. In a further embodiment of the invention, this simplification involves applying a rounding technique to the fractional solution. The ultimate result is that an integral solution is formed by rounding the fractional flows to a single integer solution that may be used to identify a single primary path for each wireless station (per demand).

The rounding technique provided by the present invention can be illustrated by making using of another network model. Let G'(V,E') be a directed graph created by the divided flows of a fractional solution from original graph G(V,E) mentioned before. A "directed link" (u, v)$\in$E may be said to be included in G' only if there is strictly positive flow from wireless station u to station v. Without a loss of generality, the present invention assumes that G'(V,E') is an acyclic graph. A directed cycle can be estimated by flow decomposition. For example, every station, υ, where v∈U is split into two stations, denoted by $v_{in}$ and $v_{out}$, connected by an edge $(v_{in}, v_{out})$. All incoming edges of v are attached to $v_{in}$ while outgoing edges of v incident $v_{out}$, and the demand $d_υ$ is associated with station $v_{out}$. Thus, the traffic flow traversing through the edge $(v_{in}, v_{out})$ is the aggregated flow $F_υ$ of station v. A single-source unsplittable flow technique can then be applied to the constructed graph G'.

To satisfy flow conservation requirements, the present invention associates a token $t_υ$ with each wireless station $v_{out}$ and modifies network flows by, in effect, "moving" tokens on the graph G' backward along a path, until they reach an AP. As token $t_υ$ is so-moved along an edge (e.g., link) e, a flow $f_e$ may be reduced by $d_υ$. Edges with zero flow are eliminated. So, at any time networks operating using the routing techniques provided by the present invention are assured to satisfy flow conservation requirements with respect to current locations of the tokens. Finally, a primary path or VC of every station, v, is identified and selected as the route that the token $t_υ$ moves along.

In more detail, both a token identifier and its current location may be denoted by $t_υ$. In a preliminary phase, the techniques provided by the present invention check every token $t_υ$ to determine whether or not there is an incoming edge (e.g., link) $e=(u, t_υ)$ with a flow greater than or equal to $d_υ$. If so, $t_υ$ is moved to u and the flow of e is decreased by $d_υ$. If, as a result, e does not carry any more flow, it is removed from the graph. This step is repeated as much as possible. The only tokens that are retained within the graph are those that do not coincide with an AP. At this point the present inventors discovered that the resulting instance maintains a so-called "degree property" (i.e., maintains a number of incoming and outgoing links) such that the tokens are located only at stations with at least two incoming edges (e.g., links).

In yet more detail, the movement of a token may proceed in iterations consisting of a number of steps. First an alternating cycle is found. Then the flow along this cycle is augmented (i.e., flows are shifted). Finally, terminals are shifted according to a movement rule that keeps the degree property. The techniques provided by the present invention construct an alternating cycle by performing a tour on the graph edges. Starting at an AP, a forward path is created by following outgoing edges as long as possible. Because the graph is acyclic, the forward path must end at a station having a terminal $t_υ$. The techniques provided by the present invention also construct a backward path starting from $t_υ$. Because $t_υ$ has at least two incoming edges, the unselected edge that is chosen is the one that is not included in a forward path and one that follows an incoming edge until reaching a first station, say u, that has another outgoing edge. The techniques provided by the present invention then build another forward path by following this outgoing edge of u. During this preliminary phase, this process continues until a station, say w, that has already been visited has completed a cycle (a cycle can be viewed as consisting of alternating forward and backward paths).

After the end of the preliminary phase, a rounding technique provided by the present invention modifies the flow along a cycle by shifting a small amount of flow from forward paths to backward paths in a way that maintains flow conservation requirements. Two quantities, $\in_f$ and $\in_b$ are calculated, where $\in_f$ is the minimal flow of the edges along the forward paths and $\in_b$ is the minimal difference between the flow along a link $(u, t_υ)$ and the demand $d_υ$ for every terminal $t_υ$ that is located in one of the cycle stations (or infinity if there are no terminals in the cycle). The shifted amount of flow is then the smaller of the two, i.e., $\min(\in_f, \in_b)$. If the minimum is achieved for $\in_f$ and after augmentation (i.e., flow shifting) there is no flow along one of the forward edges, then this edge may be removed. Otherwise, the minimum is obtained for an edge $(u, t_υ)$ on a backward path. After augmentation, the flow along this path is $d_υ$.

Finally, token $t_υ$ may be moved along the edges of a backward path (and possibly more edges). These edges may then be removed from the graph. The rounding technique is substantially halted, forming an integral solution, when all of the tokens reach an AP and the corresponding paths are determined for the traffic flows.

FIGS. 3(a)-3(f) pictorially illustrate a few steps of the rounding technique just described, using the fractional solution represented by FIG. 2. FIGS. 3-(a) and 3-(c) present two alternating-cycles, while FIGS. 3-(b) and 3-(d) show resulting flows after some flow has been shifted from forward paths to backward paths (e.g., 2 units in FIG. 3-(b) and 1 unit in FIG. 3-(d)). After these two flow shifting operations are performed, the token $t_g$ can be moved to an AP, as shown in FIG. 3-(e). A final integral solution is given in FIG. 3-(f).

In yet an additional embodiment of the present invention, a rounding technique provided by the present invention may generate an unsplittable flow such that the total flow through any edge exceeds its initial flow by less than a maximal demand. From this it follows that the unsplittable flow through any station, v, where υ∈U is less than $F_v^f + d_{max}$, where $F_v^f$ is the station flow provided by a fractional solution.

It should be noted that although the identification of paths that satisfy capacity constraints is itself NP-hard, the model utilized by the present invention assumes that $d_{max}$ is much, much less than W and that W is lower than the actual channel capacity, to reserve some bandwidth for management-related traffic. This assumption allows the present invention to further assume that a given network can tolerate small violations in the capacity constraints. In other words, the present invention provides for integral solutions that may exceed the link capacity, W, by at most $4 \cdot d_{max}$.

In the second routing technique provided by the present invention, a solution to the NP-hard problem of identifying VC paths may be approximated by placing upper and lower bounds $d_{min}$ and $d_{max}$ on a bandwidth demand $d_υ$ of every wireless station, υ, where v∈U. In addition, each wireless station is permitted to have an arbitrary, initial energy level $b_υ$. This second routing technique ensures that a calculated network lifetime, $T^i$, is at least $2/(2+\alpha)$ of an optimal lifetime, where $\alpha = d_{max}/d_{min}$.

Similar to the first routing technique, this technique also calculates a fractional solution and then uses the rounding method described above. Unlike the previous technique, however, this second technique uses a different fractional routing formulation; only stations with a sufficient, initial energy level that can relay packets are considered in formulating a solution. Collectively, these stations may be referred to as a "relay group" and are selected according to the following observation. If T* is the lifetime of a network generated by an optimal, integral solution, a station, u, may serve as a relay for packet flows only if its initial energy level is sufficient to support its own flow $d_u$ and at least one other flow equal to or greater than $d_{min}$ (i.e., a minimum flow of traffic through the station), for a period of T*. In sum, $b_u \geq T^* \cdot (d_u + d_{min})$. Said another way, each wireless station must have an initial, sufficient energy level to route its own traffic and traffic of at least one other station for a network lifetime.

Thus, for a given lifetime T, a network relay group can be defined as the set, $$R(T) = \{u | u \in U \wedge b_u \geq T \cdot (d_u + d_{min})\} \quad (6)$$

Based on the above, a fractional routing problem can be formulated as follows:

$$\max T$$

subject to:

$$\forall v \in U: \quad 1/T \geq \left(d_v + \sum_{u \in N(v)} f_{u,v}\right)\bigg/ b_v \quad (7)$$

$$\forall v \in R(T): \quad \sum_{u \in N(v)} f_{u,v} = d_v + \sum_{u \in N(v)} f_{v,u} \quad (8)$$

$$\forall v \in U - R(T): \quad \sum_{u \in N(v)} f_{u,v} = d_v \quad (9)$$

$$\forall a \in A: \quad W \geq \sum_{u \in N(a)} f_{u,a} \quad (10)$$

$$\forall v \in U: \quad (W + d_v)/2 \geq \sum_{u \in N(v)} f_{v,u} \quad (11)$$

$$\forall (u, v) \in E: \quad f_{u,v} \geq 0, f_{v,u} \geq 0 \quad (12)$$

Equation (7) represents a constraint that ensures that T is a lower bound of the lifetime of every station, $v$, where $v \in U$. Equation (8) is a flow conservation requirement constraint on relay stations and Equation (9) represents a constraint that ensures that an incoming flow of traffic to any other non-AP station, $v \in U - R(T)$, meets its demand. Finally, Equations (10) and (11) represent constraints that guarantee capacity constraints and Equation (12) ensures that all flows are positive.

Unfortunately, this formulation is not a linear program. Therefore, the same techniques described before cannot be used. That is to say, to form a linear program, something other than the variable $Y_{max}$ must be used.

In another embodiment of the invention, the present inventors discovered that this formulation becomes a linear program for a fixed T. This enables an optimal fractional lifetime to be generated by performing a binary search over T and then checking to see whether or not a fractional flow solution is generated that satisfies the predicted lifetime T. More specifically, the present invention provides for performing a binary search by estimating a value for T, namely $T = \min_{v \in U} b_v/d_v$, an upper bound on the network lifetime.

Given that: (a) T represents a network lifetime generated by a fractional solution (and thus represents a lower bound for a network lifetime) that allows each station to have multiple routing paths; (b) T* represents an optimal network lifetime that allows each station to have only a single routing path; and (c) $T^i$ represents a network lifetime derived from rounding the fractional solution network lifetime, the present inventors discovered that $$T^i \geq \frac{2}{2+\alpha} \cdot T^*,$$

where $\alpha = d_{max}/d_{min}$ and $d_{max}$ and $d_{min}$ are the upper and lower bounds on bandwidth demands.

Proof of this value for $T^i$ is beyond the scope of the present invention and is not necessary for an understanding or appreciation of the present invention.

In the third routing technique provided by the present invention, approximate solutions to the NP-hard problem of identifying primary paths are provided even though no bounds are placed on the bandwidth demands of each wireless station and even though each station is allowed to have an arbitrary, initial energy level. More specifically, the third technique comprises a new 5-approximation technique that combines the use of relay groups described before (i.e., each station must have a sufficient energy level to be considered) and a scaling technique.

A model of a static, multi-hop network using such a technique is as follows. Given a graph $G(V, E)$ with an auxiliary source station s as described above, and letting $d_{max}$ be the maximal bandwidth demand, stations are divided into disjoint groups $D_k$, $k>0$ based on their demands. A station, $v$, where $v \in U$ is included in group k if and only if $$\frac{d_{max}}{2^k} < d_v \leq \frac{d_{max}}{2^{k-1}}.$$

Thus, $$D_k = \left\{ v \mid v \in U \wedge \frac{d_{max}}{2^k} < d_v \leq \frac{d_{max}}{2^{k-1}} \right\}.$$

The number of sets is bounded by $|V|$, when ignoring empty sets. The 5-approximation technique of the present invention may simultaneously generate a fractional solution, for each relay group of wireless stations within a network, provided each station in a group has a sufficient energy level to relay traffic as described before, to form a linear program. Next, the third technique separately applies the rounding technique described before to each relay group $D_k$ to obtain integral flows (i.e., to identify a single primary path for each wireless station).

In greater detail, consider any integral solution with network life T, a station $v \in U$ may serve to relay packets in flow $d_v$ of any station $u \in D_k$ only if $b_u \geq (d_v + d_u) \cdot T$. Thus, for a given lifetime T, a group of possible relays may be defined as, $R_k(T)$, for each set $D_k$, $$R_k(T) = \left\{ u \mid u \in U \wedge b_u \geq \left(\frac{d_{max}}{2^k} + d_u\right) \cdot T \right\}.$$

A fractional routing problem may then be formulated that only allows stations in $R_k(T)$ to relay traffic of flows in $D_k$.

Let $F_{u,k}$ and $f_{u,v,k}$ denote the amount of traffic that traverses station v and link (u, v) to satisfy the demands of the stations in $D_k$, respectively. For generality, let $d_{v,k} = d_v$ if $v \in D_k$, or 0 otherwise. A fractional routing problem can therefore be formulated as follows:

$$\max T$$

subject to:

$$\forall v \in U: \quad 1/T \geq \left(d_v + \sum_{u \in N(v), k > 0} f_{u,v,k}\right)\bigg/ b_v \quad (13)$$

$$\forall k > 0, v \in R_k(T): \quad \sum_{u \in N(v)} f_{u,v,k} = d_{v,k} + \sum_{u \in N(v)} f_{v,u,k} \quad (14)$$

-continued $$\forall k > 0, v \in U - R_k(T): \sum_{u \in N(v)} f_{u,v,k} = d_{v,k} \quad (15)$$

$$\forall \alpha \in U: \quad W \geq \sum_{u \in N(\alpha), k > 0} f_{u,\alpha,k} \quad (16)$$

$$\forall v \in U: \quad (W + d_v)/2 \geq \sum_{u \in N(v), k > 0} f_{v,u,k} \quad (17)$$

$$\forall k > 0, (u, v) \in E: \quad f_{u,v,k} \geq 0, f_{v,u,k} \geq 0 \quad (18)$$

In this formulation, Equation (13) sets forth a first constraint that ensures that T is a lower bound of the lifetime of every station, $\upsilon$, where $v \in U$. The second and third constraints set forth in Equations (14) and (15) are the flow conservation requirements of relay and terminal stations for every demand group $D_k$. The remaining two constraints set forth in Equations (16) and (17) ensure capacity constraints. As before, Equation (18) ensures that the flows will be positive.

Like the formulation provided by the second routing technique of the present invention, this third technique does not initially provide a linear program; however, as before, one can be generated for a fixed T. A linear program can be formed from a fractional solution by performing a binary search over T and then checking to see whether or not there is a suitable flow assignment that satisfies an estimated (i.e., guessed) lifetime. Then, the flow of each relay group $D_k$ is rounded separately. The final solution represents a collection of identified primary paths for each station, $\upsilon$, where $v \in U$.

After the primary paths have been identified by one or more of the three techniques described above, NOC 40 is operable to send forwarding table information associated with the identified paths to each of the respective stations 20a,20b, ... 20n and 30a,30b, ... 30n in order to control the routing of traffic through each of the stations. In one embodiment of the present invention, the NOC 40 is operable to generate the forwarding table information associated with each primary path. This information is sent to the wireless stations which use the information to update corresponding forwarding tables stored by each station. Thereafter, each station uses its own, updated forwarding tables to route traffic.

In effect, each station receives forwarding table information associated with one or more primary paths that were identified by rounding a fractional solution, that depends on the application (or lack of application) of bandwidth demand and energy level bounds, into an integral solution.

Having set forth some examples of the present invention that make use of CANs to route traffic in static, multi-hop wireless networks, others may be envisioned within the scope of the present invention, which is better defined by the claims which follow.

We claim:

1. A method for identifying primary routing paths in a static, multi-hop, configurable access wireless network to maximize the lifetime of the network comprising:

generating a fractional routing solution for each wireless station in the network to form a linear program making use of two constraints, where one constraint ensures traffic withdrawn by each station equals its bandwidth demand, and a second constraint ensures an aggregated flow originating at a source station is a sum of each station's bandwidth demand;

rounding the fractional solution into an integral solution to identify a primary path for each of the wireless stations; and controlling the routing of traffic through each of the wireless stations using the identified primary paths to maximize a lifetime of the network.

2. The method as in claim 1 wherein the lifetime of the wireless network is at least 50% of an optimal lifetime.

3. The method as in claim 2 wherein each of the wireless stations initially have the same energy levels.

4. The method as in claim 2 wherein each of the wireless stations initially have the same bandwidth demands.

5. The method as in claim 1 further comprising generating the fractional solution using a variable related to the lifetime of the network.

6. A method for identifying primary routing paths in a static, multi-hop, configurable access wireless network to maximize the lifetime of the network comprising:

generating a fractional routing solution, based on those wireless stations in the network that have a sufficient, initial energy level to relay traffic, to form a linear program making use of two constraints, where one constraint ensures traffic withdrawn by each station equals its bandwidth demand, and a second constraint ensures an aggregated flow originating at a source station is a sum of each station's bandwidth demand;

rounding the fractional solution into an integral solution to identify a primary path for each of the wireless stations; and controlling the routing of traffic through each of the wireless stations using the identified primary paths to maximize a lifetime of the network.

7. The method as in claim 6 wherein the network lifetime of the wireless network is at least $$\frac{2}{2+\alpha}$$

of an optimal lifetime, where $\alpha$ is a ratio of upper and lower bandwidth demand bounds.

8. The method as in claim 7 wherein each of the wireless stations initially has an arbitrary energy level and is associated with upper and lower bandwidth demand bounds.

9. The method as in claim 6 wherein the sufficient, initial energy level of each wireless station is at least a level required to route traffic of a station and traffic of at least one other station for a network lifetime.

10. The method as in claim 6 further comprising generating the fractional solution by at least performing a binary search over an estimated network lifetime.

11. A method for identifying primary routing paths in a static, multi-hop, configurable access wireless network to maximize the lifetime of the network comprising:

generating a fractional routing solution for each relay group of wireless stations in the network to form a linear program making use of two constraints, where one constraint ensures traffic withdrawn by each station equals its bandwidth demand, and a second constraint ensures an aggregated flow originating at a source station is a sum of each station's bandwidth demand;

separately rounding each of the fractional solutions into an integral solution to identify a primary path for each of the wireless stations; and controlling the routing of traffic through each of the wireless stations using the identified primary paths to maximize a lifetime of the network.

12. The method as in claim 11 wherein the lifetime of the wireless network is at least 20% of an optimal lifetime.

13. The method as in claim 12 wherein each of the wireless stations initially has an arbitrary energy level and is not limited by an upper or lower bandwidth demand bound.

14. The method as in claim 11 wherein each of the stations within each relay group has a sufficient, initial energy level to relay traffic.

15. The method as in claim 14 wherein the sufficient, initial energy level of each wireless station within a relay group is at least a level required to route traffic of a station and traffic of at least one other station for a network lifetime.

16. A controller, for identifying primary routing paths in a static, multi-hop, configurable access wireless network to maximize the lifetime of the network, operable to:
generate a fractional routing solution for each wireless station in the network to form a linear program making use of two constraints, where one constraint ensures traffic withdrawn by each station equals its bandwidth demand, and a second constraint ensures an aggregated flow originating at a source station is a sum of each station's bandwidth demand;
round the fractional solution into an integral solution to identify a primary path for each of the wireless stations; and
control the routing of traffic through each of the wireless stations using the identified primary paths to maximize a lifetime of the network.

17. The controller as in claim 16 wherein the lifetime of the wireless network is at least 50% of an optimal lifetime.

18. The controller as in claim 17 wherein each of the wireless stations initially have the same energy levels.

19. The controller as in claim 17 wherein each of the wireless stations initially have the same bandwidth demands.

20. The controller as in claim 16 further operable to generate the fractional solution using a variable related to the lifetime of the network.

21. A controller, for identifying primary routing paths in a static, multi-hop, configurable access wireless network to maximize the lifetime of the network, operable to:
generate a fractional routing solution, based on those wireless stations in the network that initially have a sufficient energy level to relay traffic, to form a linear program making use of two constraints, where one constraint ensures traffic withdrawn by each station equals its bandwidth demand, and a second constraint ensures an aggregated flow originating at a source station is a sum of each station's bandwidth demand;
round the fractional solution into an integral solution to identify a single primary path for each of the wireless stations; and
control the routing of traffic through each of the wireless stations using the identified primary paths to maximize a lifetime of the network.

22. The controller as in claim 21 wherein the network lifetime of the wireless network is at least $$\frac{2}{2+\alpha}$$

of an optimal lifetime, where $\alpha$ is a ratio of upper and lower bandwidth demand bounds.

23. The controller as in claim 22 wherein each of the wireless stations initially has an arbitrary energy level and is associated with upper and lower bandwidth demand bounds.

24. The controller as in claim 21 wherein the sufficient, initial energy level of each wireless station is at least a level required to route traffic of a station and traffic of at least one other station for a network lifetime.

25. The controller as in claim 21 wherein the controller is further operable to generate the fractional solution by at least performing a binary search over an estimated network lifetime.

26. A controller, for identifying primary routing paths in a static, multi-hop, configurable access wireless network to maximize the lifetime of the network, operable to:
generate a fractional routing solution for each relay group of wireless stations in the network to form a linear program making use of two constraints, where one constraint ensures traffic withdrawn by each station equals its bandwidth demand, and a second constraint ensures an aggregated flow originating at a source station is a sum of each station's bandwidth demand;
separately round each of the fractional solutions to form an integral solution to identify a primary path for each of the wireless stations; and
control the routing of traffic through each of the wireless stations using the identified primary paths to maximize a lifetime of the network.

27. The controller as in claim 26 wherein the lifetime of the wireless network is at least 20% of an optimal lifetime.

28. The controller as in claim 27 wherein each of the wireless stations initially has an arbitrary energy level and a bandwidth demand that is not limited by an upper or lower bound.

29. The controller as in claim 26 wherein each of the stations within each relay group has a sufficient, initial energy level to relay traffic.

30. The controller as in claim 29 wherein the sufficient, initial energy level of each wireless station within a relay group is at least a level required to route traffic of a station and traffic of at least one other station for a network lifetime.

* * * * *

UNITED STATES PATENT AND TRADEMARK OFFICE
CERTIFICATE OF CORRECTION

| | | |
|---|---|---|
| PATENT NO. | : 7,583,602 B2 | Page 1 of 1 |
| APPLICATION NO. | : 10/879064 | |
| DATED | : September 1, 2009 | |
| INVENTOR(S) | : Bejerano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Fourteenth Day of September, 2010

David J. Kappos
*Director of the United States Patent and Trademark Office*